United States Patent
Gaines

[11] Patent Number: 6,089,267
[45] Date of Patent: Jul. 18, 2000

[54] AUTOMATIC BY-PASS VALVING SYSTEMS AND METHODS

[75] Inventor: Bryan Gaines, Lexington, S.C.

[73] Assignee: Pirelli Cable Corporation, Lexington, S.C.

[21] Appl. No.: 09/149,697

[22] Filed: Sep. 8, 1998

Related U.S. Application Data

[62] Division of application No. 08/592,030, Jan. 26, 1996, Pat. No. 5,865,212.

[51] Int. Cl.⁷ .................................................... F16K 17/02
[52] U.S. Cl. ........................ 137/599; 137/493; 174/22 R
[58] Field of Search .................. 174/22 R; 137/599, 137/493, 599.1

[56] References Cited

U.S. PATENT DOCUMENTS

| | | | |
|---|---|---|---|
| 3,216,444 | 11/1965 | Herner | 137/493 |
| 3,483,886 | 12/1969 | Napolitano | 137/493 |
| 3,602,304 | 8/1971 | Mallinger | 174/21 |
| 3,802,748 | 4/1974 | Michelone | 137/493 |
| 3,819,846 | 6/1974 | Jakobsen | 174/11 R |
| 4,733,690 | 3/1988 | Brunner | 137/513 |
| 5,207,243 | 5/1993 | Sarro | 174/22 R X |
| 5,280,131 | 1/1994 | Sarro | 137/498 |

*Primary Examiner*—Stephen M. Hepperle
*Attorney, Agent, or Firm*—Norris Mc Laughlin & Marcus; L. P. Brooks

[57] ABSTRACT

An automatic by-pass valving system for an electrical cable system wherein insulating fluid at a pressure above atmospheric pressure is supplied to an electrical power cable, such as a pipe-type or self-contained cable, having a fluid flow channel and having at least one hydraulic stop interrupting the flow of fluid between the channels of adjacent portions of the cable which are at different elevations. The valving system comprises a check valve, which allows fluid flow only in a first direction, from the lower elevation portion to the higher elevation portion, and a flow-limiting valve, which allows fluid flow only in a second direction, from the higher elevation portion to the lower elevation portion, at a reduced rate. Preferably, a relief valve is also provided to allow fluid flow in the second direction at a higher rate if the fluid pressure difference in the second direction is exceeded by a predetermined amount. The valving system limits the loss of the insulating fluid from the cable when the lower elevation portion is ruptured, protecting the environment, while permitting a limited flow from the point of rupture to protect the cable from contamination.

17 Claims, 4 Drawing Sheets

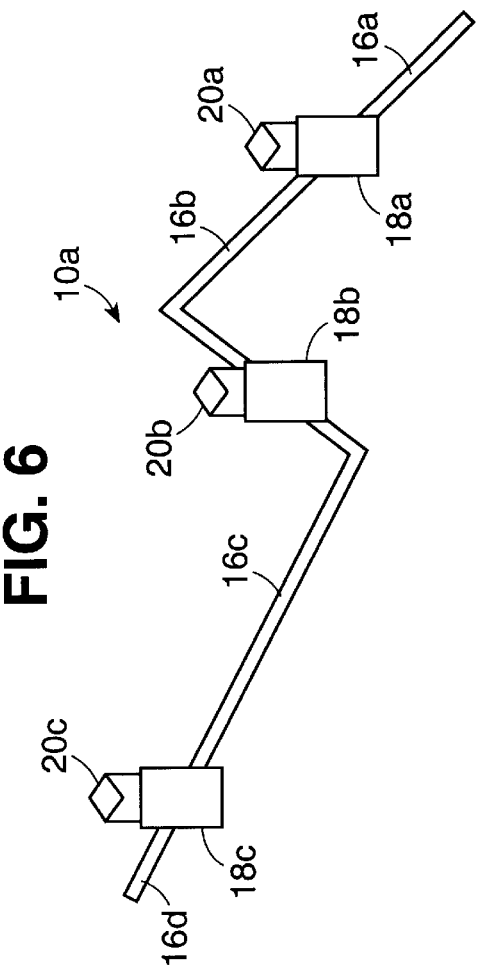
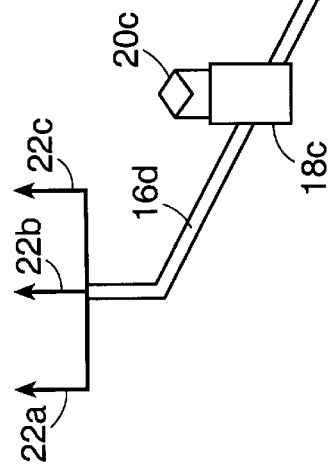
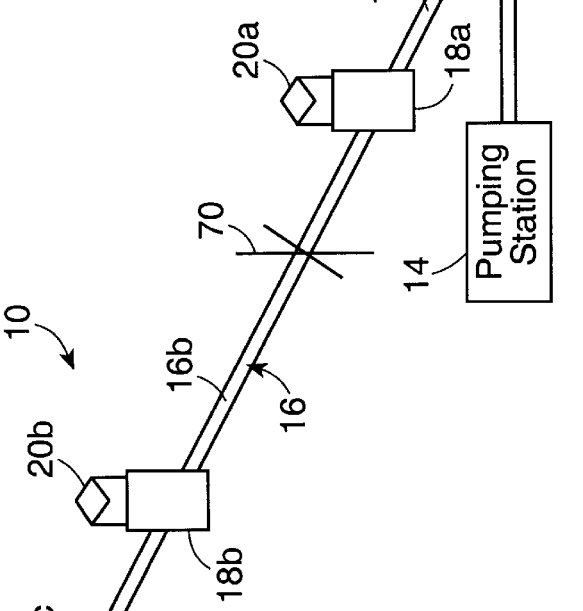
FIG. 6
FIG. 1

AUTOMATIC BY-PASS VALVING SYSTEMS AND METHODS

This application is a division, of application Ser. No. 08/592,030, filed Jan. 26, 1996 now Pat. No. 5,865,212.

The present invention relates to automatic by-pass valving systems and methods for electrical cables containing fluids under pressure and, more particularly, automatic by-pass valving systems and methods for limiting the release of dielectric fluid from a ruptured, fluid-filled electrical cable, e.g. a pipe-type cable or a self-contained cable.

BACKGROUND OF THE INVENTION

Electrical power cable systems often utilize dielectric insulating fluid as a means of preserving the integrity of electrical cable insulation constructed from dielectric fluid-impregnated electrical insulation materials and in some cases, for cooling of the cable. In a pipe-type electrical power transmission cable system, dielectric insulating fluid surrounds insulated conductors within a pipe. In a self-contained electrical power transmission cable system, dielectric insulating fluid is introduced into the cable system via one or more fluid passages constructed within the cable, and the fluid pressure is retained within the cable by the action of outer-non-permeable sheathing which surrounds one or more insulated conductors. As is known in the art, the fluid is maintained under pressure by one or more external sources of fluid under pressure, such as pumping stations or pressurized fluid reservoirs and can be static or circulated within the pipe or duct. When such pipe-type or self-contained cables are run from points of lower elevation to points of higher elevation, a pumping station at the lower elevation point can be used to pressurize or circulate the insulating fluid. However, the pumping station can be at the higher elevation point, or there can be several pumping stations located at one or more end points and/or at points intermediate to the lowest elevation and highest elevation points.

Most modern dielectric fluids are synthetic in nature, while many older installations contain oil-based dielectric fluids. Regardless of the specific type of dielectric fluid under consideration, nearly all environmental regulatory agencies concur in that the release of significant quantities of dielectric fluid into the environment is highly undesirable. In fact, various state and local environmental regulatory bodies have acted to restrict or eliminate the construction of new fluid-filled cable systems, particularly if these new systems have been designed without provision being made for the restriction of fluid loss from the cable system. Furthermore, many electrical utility companies who are possessed of large existing fluid filled cable systems, representing tremendous capital investment, have been recently presented with mandates requiring the modification of these existing cable systems to incorporate such fluid loss restrictive provisions, particularly in the case of cable systems crossing or lying near notable bodies of water. Breaks or ruptures in the pipe or cable sheath can cause the unrestricted release of thousands of gallons of fluid, which can cause substantial losses of plant and animal life. In addition to the environmental impact, replacement of the released fluid is expensive. In addition, once the fluid has escaped from the cable, water or dirt can enter the cable or cable system pipeline through the break. Such contamination of the cable or cable system pipeline by the environment can require the replacement of significant lengths of cable.

Although various types of electrical power transmission cables exist which do not require the presence of fluid dielectric material, these types of cables do not have the decades long history of reliable operation at high voltages and high ampacities as do fluid-filled cable systems. Also, the replacement of the hundreds of miles of existing fluid-filled cable systems, (in the United States mostly pipe-type cable systems), with solid dielectric insulation cables would involve such extraordinary cost as to be unfeasible. This solution to the environmental regulatory concerns stated previously becomes even more unattractive when it is considered that the lower current carrying capacity of solid dielectric insulation type cables would require that a given number of existing pipe-type cable circuits be replaced with a greater number of solid dielectric insulation type cable circuits, if the operating voltages are left unchanged.

Superconducting cables are being developed which are intended to serve as transmission cable systems. For retro-fit pipe installations and new installations (utilizing superconducting cables), the cables being developed will utilize dielectric fluid impregnated electrical insulation of a similar nature to that which is currently used as the electrical insulation for pipe-type cables. In fact, the construction of these cables, as presently envisioned will be such that existing copper conductor type and aluminum conductor type pipe-type cable systems can be retro fitted with the superconducting cable, leaving the pipe system manholes and pressure support equipment essentially unchanged. Obviously, with the operation of these superconductive cable systems remaining dependent on the use of fluid dielectric materials within the system pipeline, the same concerns regarding the restriction of dielectric fluid leakage from the pipeline apply.

To address these problems, well-known stop joints are typically provided between cable portions or sections to hydraulically isolate such cable portions or sections. The stop joint is a device which mechanically and electrically interconnects cable sections, but which prevents the flow of the fluid directly from the pipe of one pipe cable section to the pipe of the next pipe section, in the case of pipe cables, or from the fluid duct of one self-contained cable to the fluid duct of the next self-contained cable. However, each stop joint has manually operable by-pass valves and piping which interconnect one side of the stop joint with the other side of the stop joint so that when the by-pass valves are open, the fluid can flow therethrough and between the pipes or ducts of the cable sections connected to the joint. Such by-pass valves are usually accessed through a manhole.

In the event of a break in a pipe or duct of such a system and even though the break and reduction in pressure may be sensed at the pumping station, causing the pumping station to cease the supply of fluid, fluid in the pipe or duct at elevations above the rupture site, including fluid above the nearest stop joint, flows towards the rupture site due to gravity. Fluid from above the stop joint is lost through the rupture until the rupture is located and the nearest by-pass valve above the rupture is manually closed by maintenance crews, who must enter the appropriate manhole. Thousands of gallons of fluid can be lost before the proper valve is closed, causing severe damage to the environment and monetary loss. Once the valve is closed and the fluid flow ceases, the cable is exposed to contamination from the environment.

One alternative to the manual by-pass valve is to put sensors and a motorized valve in the manhole. This is not cost effective, however. It is also undesirable to provide electrical power in the manhole.

U.S. Pat. Nos. 5,207,243 and 5,280,131, both issued to Sarro, describe a two way fluid flow check valve controlled by a piston within the valve housing. Internal and external pressures move the piston towards the direction of lower fluid pressure, closing the valve. When the valve is closed, the flow of fluid from the cable portion or portions at elevations higher than the valve is prevented. Until the valve closes, however, such fluid flows out of the break. After the valve closes, fluid in the cable between the break and the valve continues to flow out of the cable through the break until there is only a small amount of fluid in the portion of the cable between the break and the valve. The cable is then subject to the risk of contamination at the break.

SUMMARY OF THE INVENTION

The present invention provides an automatic by-pass valving system which can be applied to fluid conveying pipes or ducts to enable flow of fluid beyond a conventional fluid flow-isolator, such as a stop joint, and to limit the loss of fluid caused by a break in the pipe or duct to a limited rate. The limited rate of flow prevents contamination of the cable but poses minimal risk to the environment.

In accordance with the preferred embodiment of the invention, the automatic valve system comprises means including a check valve which can be connected to the pipe or ducts so as to provide a first path for fluid flow around a device, such as a stop joint which interrupts the flow of fluid from one pipe or duct to another pipe or duct, only in the direction from a portion of cable at a lower elevation to a portion of the cable at higher a higher elevation. The valve system also includes means including a flow limiting valve which can be connected to the pipe or ducts so as to provide a second path for limited fluid flow around said device in the direction from the portion of the cable at higher elevation to the portion of the cable at lower elevation. The valve system also includes means including a relief valve which can be connected to the pipe or ducts so as to provide a third path for fluid flow from the portion of the cable at higher elevation to the atmosphere or to the portion of the cable at lower elevation when the fluid pressure difference between the fluid in the portion of the cable at higher elevation exceeds the fluid pressure in the portion of the cable at lower elevation by a predetermined value. However, in some cases, the means providing a third path can be omitted.

Thus, in the preferred embodiment of the invention, there are three valves, a first one of which permits fluid to flow from the lower portion of the cable to a higher portion of the cable, a second one of which permits fluid to flow from the higher portion of the cable to the lower portion of the cable at a limited rate, e.g. 0.25 gallons per minute, and a third one of which permits fluid to flow temporarily to either the atmosphere or the lower portion of the cable when the fluid pressure across the third valve exceeds a predetermined value, e.g. the weight of the fluid above the third valve plus 30 psi.

The invention also includes an electrical cable system in which the cable, either a pipe-type or self-contained cable, includes at least one portion at an elevation higher than any other portion or portions at an elevation higher than any above atmospheric pressure supplied thereto by a source of fluid under pressure above atmospheric pressure, the portions being hydraulically separated by stop joints which prevent fluid flow between the portions themselves, and an automatic valve system comprising valves which by-pass the stop joints and permit fluid to flow from lower elevation portions to the higher elevation portions but permit and limit the flow of fluid from the higher elevation portions to the lower elevation portions. The valve system may also include a relief valve which reduces the fluid pressure in the portion or portions at higher elevations when the fluid pressure across the relief valve exceeds a predetermined value.

The invention further includes a method of controlling fluid flow in electrical cable systems which comprises allowing fluid flow through a first path only in a first direction and allowing fluid flow through a second path in a second direction only at a limited rate. The method may further comprise allowing fluid flow through a third path in the second direction only if a predetermined pressure is exceeded and preventing fluid flow in the third path if the predetermined pressure is not exceeded. The first direction may be from a lower elevation to a higher elevation and the second direction may be from the higher elevation to the lower elevation.

The invention further includes a method of controlling the flow of fluid from an electrical cable system in which the cable extends from a region of lower elevation to a region of higher elevation. The cable system comprises at least one stop joint. The method comprises pumping the fluid from the lower elevation to the higher elevation through the cable; allowing the fluid to by-pass the stop joint as it is pumped from the lower elevation to the higher elevation; and allowing the fluid to flow from the higher elevation to the lower elevation, by-passing the stop joint, at a reduced rate when the fluid is not being pumped. The method can further comprise allowing the fluid to flow from the higher elevation to the lower elevation, by-passing the stop joint, at a higher rate, if a predetermined pressure is exceeded and preventing the flow from the higher elevation to the lower elevation at the higher rate when the predetermined pressure is not exceeded.

Other valves conventionally used with a stop joint can be included in addition to the valves of the invention.

BRIEF DESCRIPTION OF THE DRAWINGS

FIG. 1 is a schematic drawing of a pressurized cable system in accordance with one embodiment of the present invention;

FIG. 6 is a schematic drawing of a pressurized cable system which differs from the cable system shown in FIG. 1 and in which the valve system of the invention can be used.

DETAILED DESCRIPTION OF PREFERRED EMBODIMENTS OF THE INVENTION

Figure 2:
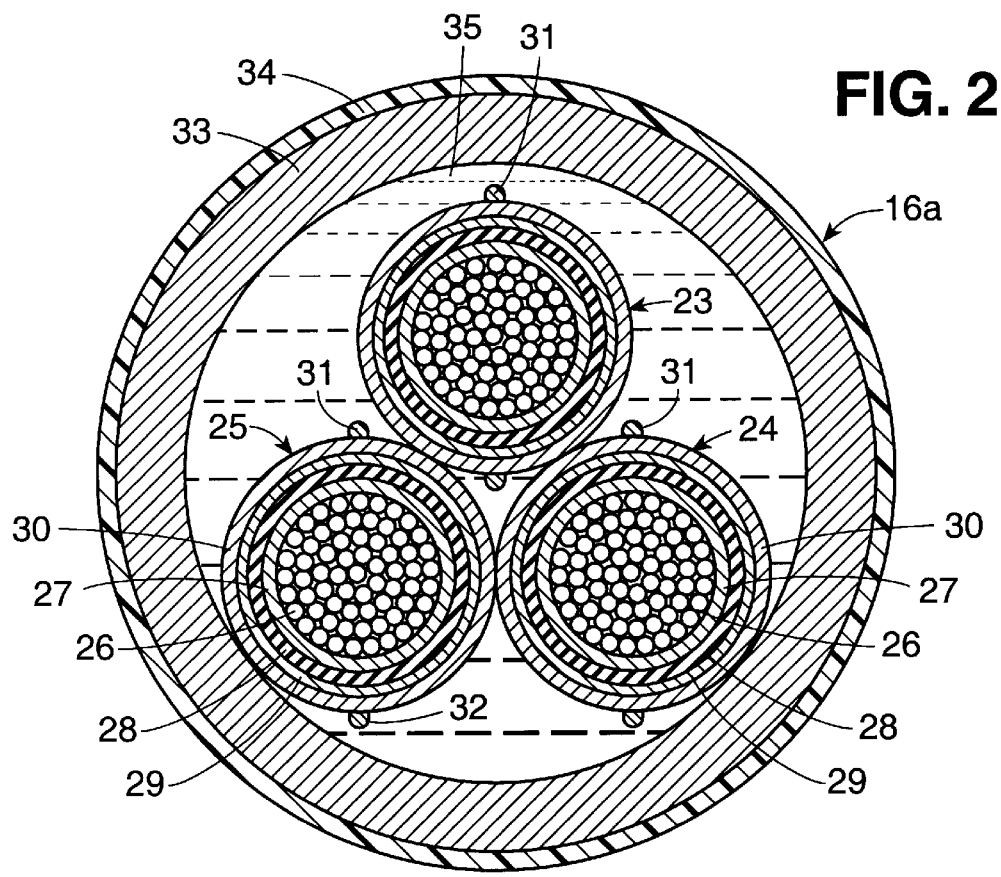
FIG. 2 is a cross-sectional view of an exemplary "pipe-type" cable which can be used in the system of FIG. 1.

FIG. 1 is a schematic drawing of a high voltage cable system 10 in accordance with one embodiment of the present invention. The system comprises a power station 12, a pumping station 14, an electrical cable 16 comprising a plurality of cable portions or sections 16a–16d, a plurality of stop joints 18a–18c, automatic by-pass valving systems 20a–20c in accordance with the present invention and associated with each joint 18a–18c, and lines 22a–22c to electrical power users. The number of cable portions 16a–16d, joints 18a–18c and associated automatic by-pass valving systems 20a–20c can vary based on the length of the system, as is known in the art. The upper end of the cable, at 16d, is at a higher elevation than the power station 12, and the pumping station 14 supplies a fluid, e.g., a dielectric insulating fluid under a pressure above atmospheric pressure to the cable portions 16a–16d. FIG. 1 also illustrates the location of a rupture or break 70 in the cable portion 16b. Conventionally, the pumping station 14 contains sensing and control apparatus which, when there is a significant drop of the pressure of the fluid in the cable, e.g., because of a break of rupture, stops the supply of fluid to the cable.

Figure 3:
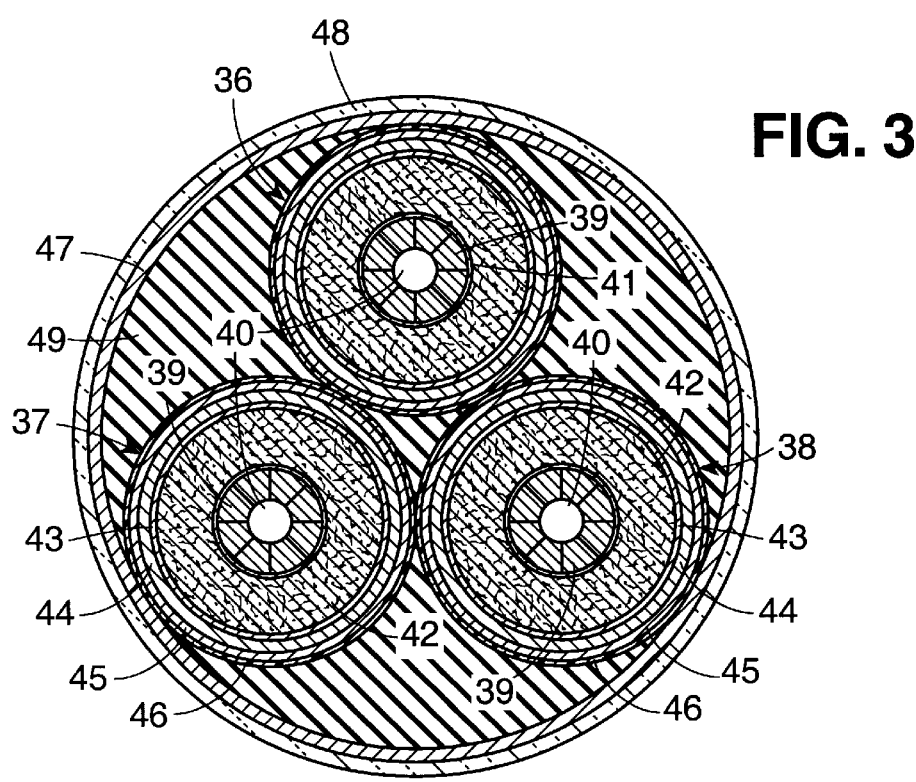
FIG. 3 is a cross-sectional view of an exemplary "self contained" cable which can be used in the system of FIG. 1.

The cable 16 comprising sections or portions 16a–16d can, for example, be a "pipe-type" cable of the type shown in FIG. 2 or a "self-contained" cable of the type shown in FIG. 3, but the invention is applicable to the control of fluid outflow from other systems having pipes or ducts filled with fluid under pressure, for example.

In a pipe type electrical cable, the electrical conductors are separately insulated from each other and are contained in a metal pipe and a dielectric fluid, under pressure above atmospheric pressure, fills the spaces within the pipe not occupied by the conductors and their coverings. FIG. 2 illustrates, in cross-section, one known type of pipe cable but the invention is applicable to other types of pipe cables. Although the cable shown in FIG. 2 is identified by the reference numeral 16a, the other sections 16b–16d can be of the same construction.

The cable shown in FIG. 2 comprises three identical units 23–25 and only the unit 23 will be described in detail. The unit 23 has a conductor 26 composed of stranded wires of high electrical conductivity, e.g., copper or aluminum wires. The conductor 26 is encircles by an inner semi-conductive screen 27, insulation 28, an outer semi-conductive screen 29, metal tapes 30 and skid wires 31 and 32.

The units 23–25 are loosely received in a fluid tight, metal pipe 33, such as a steel pipe, with a conventional corrosion protecting covering 34. The spaces within the pipe 33 not occupied by the units 23–25 are filled with a dielectric fluid 35 under pressure above atmospheric pressure. Such spaces provide fluid channels. The fluid can be static or circulated in a known manner and can, for example, be a conventional synthetic or natural fluid.

A three conductor, self-contained cable of a known type is illustrated in FIG. 3. However, instead of being bound together, as described hereinafter, the units 36–38 can be individual units not bound together since each unit 36–38 constitutes a cable which can be used without further coverings.

The units 36–38 are identical and only the unit 36 will be described in detail. The unit 36 comprises a central conductor 39 which can be made of metal segments, such as segments of copper or aluminum, which define a central duct or fluid channel 40. The conductor 39 is encircled by an inner semi-conductive screen 41, insulation 42, an outer semi-conductive screen 43, a lead or aluminum sheath 44, a blindage layer 45, e.g., a layer of metal tape, and a plastic sheath 46. Thus, the unit 36, and hence the units 37 and 38, are self-contained and can be used without further coverings.

However, if desired, the units 36–38 can be bound together within a known type of armoring layer 47 which can be covered by a protective layer 48 of a known type, e.g., a bituminous material, and/or of thermal insulating material. The spaces within the armoring layer, and the units 36–38, conventionally are filled with a filler 49 which can be jute, rubber or a plastics material.

Figure 4:
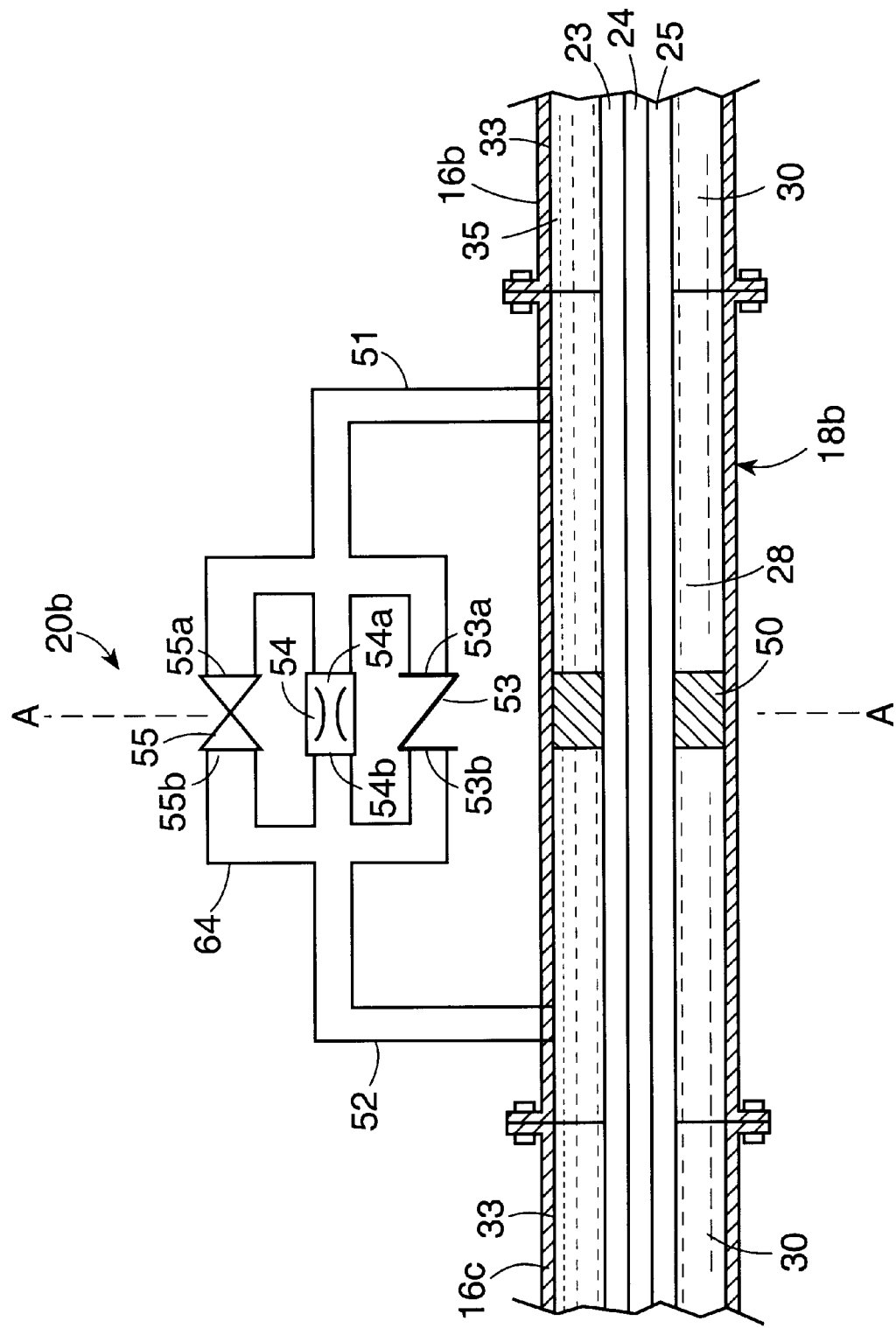
FIG. 4 is a schematic drawing of an automatic by-pass valving system of the present invention, which can be used in the cable system of FIG. 1.

FIG. 4 is a schematic diagram of a stop joint 18b coupled to two pipe-type cables 16b, 16c and the automatic by-pass valving system 20b in accordance with one embodiment of the present invention. Although FIG. 4 illustrates only the automatic by-pass valving system 20b, the other automatic by-pass valving systems 20a–20c can be the same. The stop joint 18b permits the passage of the insulated conductors 26 but not the surrounding insulating fluid 35. Of course, the stop joint 18b is illustrated only schematically and the various conventional mechanical and electrical connections are not shown. The plug 50 represents the portion of the stop joint 18b which prevents flow of the fluid 35 between the pipes 33 of the cable sections 16b and 16c. Any conventional joint can be used.

Each of the automatic by-pass valving systems 20a–20c, in accordance with the embodiment shown in FIG. 4, comprises first and second fluid conveying means such as fluid conduits or pipes 51 and 52, a check valve 53, and a flow-limiting valve 54. Preferably, a relief valve 55 is also provided. Each valve 53, 54 and 55 is between the first and second conduits 51 and 52 of the by-pass valving system 20b. In this embodiment, the valves are between the first and second conduits 51 and 52 in parallel.

The portions of the automatic by-pass valving system, joint 18b and the cable 16b to the right of the dotted line A—A are referred to as the "lower elevation" portions of the electrical cable system, and the portions to the left of the dotted line will be referred to as the "higher elevation" portions of the system. It is to be understood that the terms "lower elevation" and "higher elevation" are relative terms describing portions of the system with respect to the highest end and lowest end of the cable system 10. Thus, as shown in FIG. 6, the electrical cable system can have a portion 16c with an end connected to the stop joint 18b which is lower than the cable portion 16b which is connected to the stop joint 18b and which is lower than part of the cable portion 16a connected to the stop joint 18a. However, there are cable portions, such as part of the cable portion 16c and the cable portion 16d which are higher in elevation than the stop joint 18b and part of the cable portion 16a so that the force of gravity applies pressure to the fluid in the direction from the cable portion 16d to the lower part of the cable portion 16a. Accordingly, as used herein, the expression "higher elevation" is intended to include a valve system 20b connected as shown in FIG. 6. Other stop joints 18c and 18a and valving system 20c and 20a, above and below the illustrated portion of the system, have their own "higher" and "lower" elevation sides.

In normal operation, in the embodiments of FIGS. 1 and 6, the fluid flows from the lower elevation cable portion of each cable section 16a–16d through the automatic by-pass valving system 20a, 20b or 20c to the higher elevation cable portion of each cable 16a–16d, as described hereinafter.

The first, lower elevation conduit 51 is coupled for fluid flow to the lower elevation cable portion 16b. The second, higher elevation conduit 52 is coupled for fluid flow to the higher elevation cable portion 16c.

The check valve 53, which preferably is a positive-sealing check valve, has a lower elevation end 53a couples to the lower elevation conduit 51. The check valve 53 also has a higher elevation end 53b coupled to the higher elevation conduit 52. The check valve 53 only allows fluid flow only from the first lower conduit 52 to the second higher elevation pipe 52.

The flow-limiting valve 54, which preferably is a variable differential flow-limiting valve, has a lower elevation end 54a couples to the lower elevation conduit 51. The flow-limiting valve also has a higher elevation end 54b coupled to the higher elevation conduit 52. The primary function of the flow-limiting valve 54 is to allow fluid flow, in a second direction, from the higher elevation cable portion 16*c* to the lower elevation cable portion 16*b*, at a limited rate. The limited rate is substantially less than the rate of unrestricted flow. A preferred rate is less than about 0.25 gallons per minute (GPM), for example, but can be in the range from 0.10 to 0.50 GPM depending upon the fluid loss considered to be acceptable and which meets the requirements of the environmental regulations. Any valve allowing the passage of a controlled columnetric flow over a wide range of pressure differential, can be used. In this application, operation over a pressure differential of 500 psid–0 psid (pound per square inch differential) is preferred. Variable differential flow-limiting valves are also referred to as floating orifice valves or uniflow valves in the art. A model 30-21-001 valve from Pirelli-Jerome, Inc., Beaufort County Industrial Park, Beaufort, S.C., for example, can be used. Such Pirelli valve is a floating orifice valve which functions similarly to a pressure regulating valve in series with an adjustable orifice valve.

The relief valve 55, which preferably is a positive sealing relief valve, has a lower elevation end 55*a* which is coupled to the lower elevation conduit 51, and a higher elevation end 55*b* coupled to the higher elevation conduit 52. The relief valve 55 allows flow in the second direction, from the higher elevation conduit 52 to the lower elevation conduit 51, only when the fluid pressure on the higher elevation end 55*b* of the valve 55 exceeds the pressure on the lower elevation end 55*a* by a predetermined value, such as, for example, the weight of the fluid above the valve 55 plus 30 psi. The purpose of the relief valve 55 is to avoid a large increase in the pressure applied to the check valve 53 and the flow limiting valve 54 when a rupture or break occurs, such rupture or break causing the fluid pressure at lower elevation to become very small whereas the fluid pressure at elevations above such valves will, for a short time, be very large. If the valves 53 and 54 can withstand such fluid pressure differential, the relief valve 55 can be omitted. Also, while it is preferred that the lower end 55*a* of the relief valve 55 be connected to the lower elevation cable section, such as by way of the conduit 51, the lower end 55*a* of the valve 55 can be vented to the atmosphere or ambient because, in the latter case, the fluid loss would be relatively small. When the fluid pressure differential drops below the predetermined value, the relief valve 55 closes again. As stated, the predetermined pressure difference preferably is the weight of the fluid above the stop joint 18*b*, plus an amount such as 30 psi, which will reduce the pressure on the valves 53 and 54 to an to an acceptable value. However, depending upon the tolerance of the valves 53 and 54 to fluid pressure differential, the relief valve 55 can discharge fluid until the pressure differential is greater or less, but preferably, discharges when the pressure differential is at least greater than the weight of the higher elevation fluid. The relief valve may be a piston type positive sealing relief valve, such as the Teledyne Farris Relief valve, available from Teledyne Corporation, for example.

Operation of the cable system 10 and automatic valving systems of the present invention will be described with reference to FIGS. 1 and 4. During normal operation, fluid is pumped by the pumping station 14 from the lower elevation to the higher elevation through the cable sections 16*a*–16*d*. (See FIG. 1). The fluid flows upwardly around the stop joints 18*a*–18*c* by way of the conduits 51 and 52 and the check valve 53. (See FIG. 4). Fluid may, if desired, also flow to the higher elevation through the flow-limiting valve 54. If the pressure at the elevations above any of the stop joints 18*a*–18*c* exceeds the pressure at a lower elevation, such as if the pumping station stops pumping fluid or pressures rise within the cable due to thermal expansion, the fluid above a stop joint 18*a*–18*c* can flow to the lower elevation at the limited rate, through the flow-limiting valve 54. Generally, such pressure changes are slow in nature and can be adequately relieved through the slow flow of the flow-limiting valve 54.

If there is a cable rupture or break, as indicated at 70 in FIG. 1 which permits the fluid to flow out of the pipe 33 or a duct 40 into the ambient, the controls at the pressurization plant 14 will sense a sudden loss in fluid pressure and either restrict or stop the pumping of fluid into the cable system. While the fluid between the stop joint 18*b* and the break 70 can flow out of the cable under the influence of gravity, the flow-limiting valve 54 in the by-pass valving system 20*b*, will only allow a small additional flow of fluid from above the stop joint 18*b* to the lower elevations and out the break 70. This small flow limits the damage to the environment, while preventing contaminants, such as water or dirt, from entering the cable 16*b* through the break 70.

Ruptures or breaks in the cable caused by heavy equipment, lightning, or other catastrophic events, can cause large pressure surges through the cable system 10. To protect the valves 53 and/or 54, the relief valve 55 preferably is provided to allow for the release of fluid to relieve the pressure surge before it can damage the valves 53 and/or 54. When the threshold pressure of the relief valve 55 is exceeded, the valve 55 opens and fluid in the higher elevation cable portion 16*c* and 16*d* will be released to the lower elevation cable portion 16*b*, through the conduit 51. Such fluid will escape through the break 70 as well. When the pressure at elevations above the by-pass valving system 20*b* drops to the threshold pressure, the relief valve 48 closes and only a small additional amount of fluid will flow to lower elevations through the flow-limiting valve 46, as discussed hereinbefore. The relief valve 55 should be able to at least support the weight of the fluid at elevations above the by-pass valving system without opening. The threshold pressure is therefore preferably equal to the total weight of fluid in all the cables above the automatic valving system 20, here cable portions 16*c* and 16*d*, plus a tolerance, as discussed hereinbefore.

The automatic by-pass valving system of the present invention may be optionally fitted with additional valves to assist in the initial fill, calibration, monitoring or shutdown of the by-pass valving system, as is known in the art. For example, one or more manually operable isolation valves may be provided at opposite sides of the relief valve 55, the check valve 53 and the flow-limiting valve 54. In the embodiment of the automatic by-pass valving system 21 shown in FIG. 5, manually operable isolation valves 72 and 74 can be provided at respectively opposite sides of the relief valve 55. Manually operable isolation valves 76 and 78 can be provided at opposite sides of the flow-limiting valve 54 and the check valve 53. The isolation valves 72, 74, 76 and 78 are normally open during operation of the system. They can be closed to shut down the system. Any conventional isolation valve may be used.

Preferably, a manually operable valve instrument port 80 is preferably provided proximate the flow-limiting valve 54, to calibrate the valve. Preferably, manually operably valve instrument ports 82 and 84 are provided to enable monitoring and calibration of the system. Appropriate valve instrument ports are known in the art.

A conventional manually operable by-pass valve 86 is also provided to assist in the initial fill of the cable. The manually operable by-pass valve 86 may be connected between the first and second conduits 51 and 52, in parallel with the check valve 53, flow-limiting valve 54 and relief valve 55. The manually operable by-pass valve 86 is normally closed, is opened only during initial fill of the cable. The by-pass valve 86 is the valve normally used in the prior art to prevent fluid flow around a stop joint when the cable is ruptured. Manual valve service ports 88 and 90 can also be provided proximate the manual by-pass valve 86. These valves are also closed during normal operation but can be opened during the initial fill of the cable. Appropriate valves are known in the art.

Figure 5:
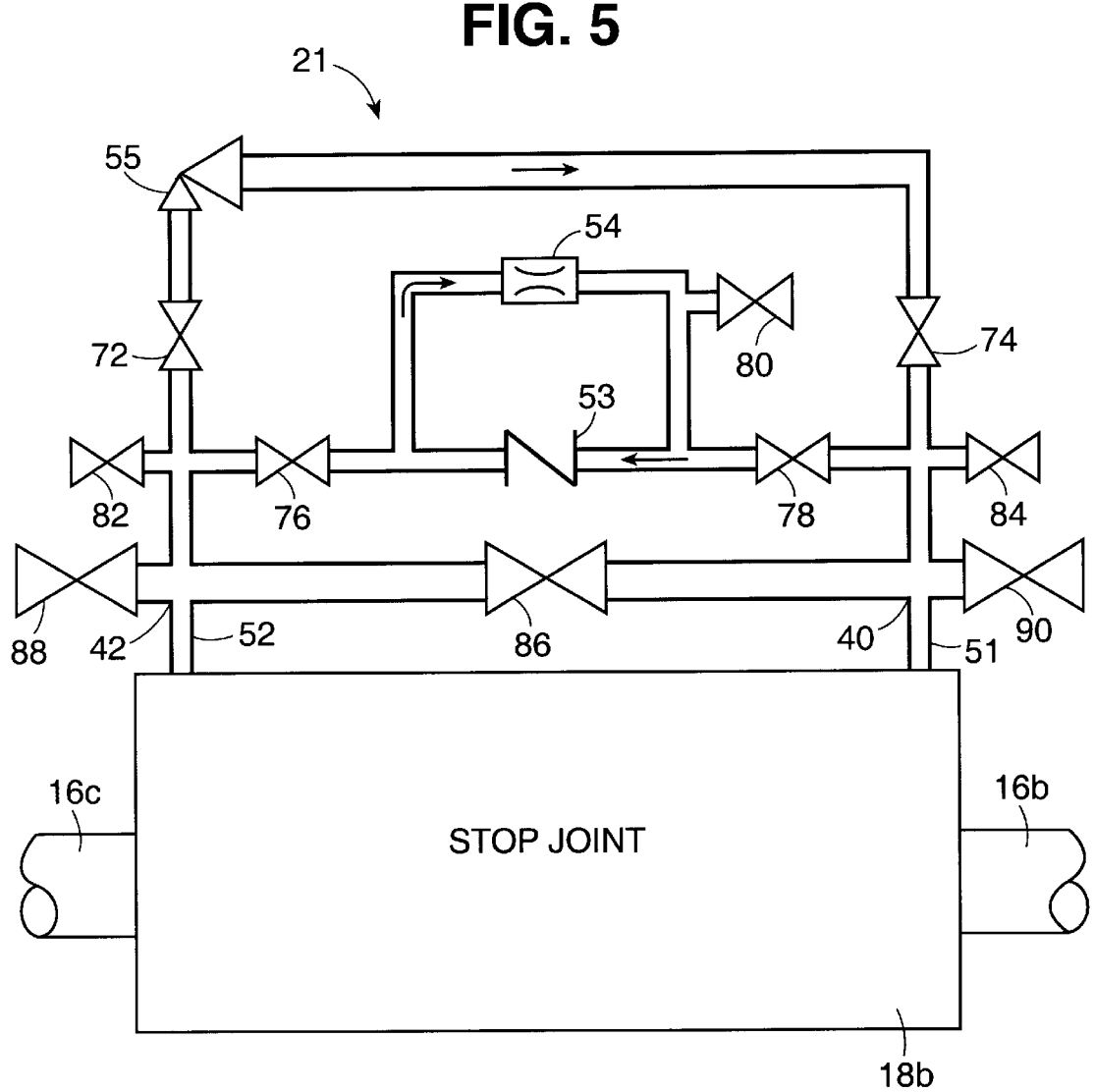
FIG. 5 is a schematic drawing of another embodiment of the automatic by-pass valving system, which can also be used in the cable system of FIG. 1.

The automatic by-pass valving system 21 of FIG. 5 operates in a similar manner to the valving system of FIG. 4. During normal operation, fluid flows from the pumping station 14, through the first cable 16b, into the first conduit 51 through the isolation valve 78, through the check valve 53, through the isolation valve 76 and into the next cable 16c through the second conduit 52. In case of a cable break or rupture, fluid is allowed to flow towards the break or rupture through the isolation valve 76, the flow-limiting valve 54, the isolation valve 78, and into the lower elevation cable through the conduit 51. As described hereinbefore, the downward flow is slow as the rate of the flow-limiting valve 54 is, preferably, not more than about 0.25 GPM. The degree of cable pressure is decided upon and controlled at the pumping station 14, as is known in the art.

If there is a sudden pressure surge due to impact, explosion or the sudden release of downstream pressure causing a high pressure differential across the relief valve 55, the valve 55 opens. Fluid can then flow through the isolation valve 72, the relief valve 55, the isolation valve 74 and out the by-pass valving system 21 through conduit 51, until the high pressure differential is reduced to a predetermined value. When the pressure differential returns to the threshold pressure, e.g., the weight of the fluid above the stop joint plus about 30 psi, the relief valve 55 closes and fluid flow to lower elevations is limited to that allowed by the flow-limiting valve 54.

It will be apparent to those skilled in the art that the particular configuration of connections between the valves in FIGS. 4 and 5 are merely illustrative and other configurations are possible and within the scope of the present invention. It is also apparent that other modification may also be made without departing from the principles of the invention.

Although the specific example of the use of the automatic by-pass valving system with a pipe type cable has been described, it will be apparent to those skilled in the art that the automatic by-pass valving system can be used with self-contained cables, the by-pass valve system being connected to the duct or ducts, or fluid channels, of the self-contained cables rather than to the pipe of the pipe type cable.

While the above embodiments specifically relate to an electrical cable, the automatic by-pass valving systems and methods of the present invention are useful in any piping or duct system which supplies fluids under pressure in one direction and which runs a risk of the unrestricted loss of fluid into the environment due to a rupture or break in the pipe or duct.

I claim:

1. An electrical cable system in which the cable contains a fluid under pressure above atmospheric pressure and the cable has a first portion at a lower elevation and a second portion at a higher elevation, said system comprising:

a source of fluid under a pressure connected to said cable for supplying said fluid to the interior of said cable;

a stop joint between said first portion and said second portion of said cable, said stop joint blocking the passage of fluid between said first portion and said second portion;

an automatic by-pass valving system coupled to the first portion and said second portion, said by-pass valving system allowing fluid flow from said first, lower elevation portion to said second, higher elevation portion around said stop joint but limiting flow of said fluid from said second, higher elevation portion to said first, lower portion to a predetermined rate.

2. The system of claim 1, wherein the by-pass valving system comprises:

a check valve coupled between said first, lower elevation portion and said second, higher elevation portion, the check valve allowing said fluid to flow substantially only from said first lower elevation portion to said second higher elevation portion; and a flow-limiting valve coupled between said first, lower elevation portion and said second, higher elevation portion, said flow-limiting valve allowing fluid to flow from said second, higher elevation portion to said first lower elevation portion at said predetermined rate.

3. The system of claim 2, wherein said by-pass valving system further comprises a relief valve coupled between said first, lower elevation portion and said second, higher elevation portion, said relief valve allowing fluid to flow from said second, higher elevation portion to said first, lower elevation portion substantially only when the fluid pressure in said second, higher elevation portion exceeds the fluid pressure in said first, lower elevation portion by a predetermined amount.

4. The system of claim 2, wherein the fluid is dielectric insulating fluid.

5. The system of claim 2, wherein said fluid is a conductor cooling fluid.

6. The system of claim 2, wherein said cable comprises a fluid impermeable pipe loosely encircling at least one insulated conductor and said fluid is in any spaces between said conductor and said pipe.

7. The system of claim 2, wherein said cable is a self-contained cable comprising a duct for the flow of said fluid, a conductor and insulation and a sheath encircling said conductor and said fluid is in said duct.

8. An electric cable system in which the cable contains a fluid under pressure above atmospheric pressure and the cable has a first portion at a lower elevation and a second portion at a higher elevation, said system comprising:

a check valve permitting fluid flow at a first rate in a first direction but preventing fluid flow in an opposite, second direction;

a flow limiting valve permitting fluid flow at said second lower rate in said second direction; and fluid conveying means connected to said check valve and said flow limiting valve and for connecting said check valve and said flow limiting valve to said first portion and said second portion, so that said check valve permits fluid flow from said first portion to said second portion and said flow limiting valve permits fluid flow from the second portion to said first portion.

9. An electric cable system of claim 8, further comprising a relief valve which permits the flow of fluid from one side thereof to the other side thereof when the fluid pressure at said one side thereon exceeds the fluid pressure at said other side thereof by a predetermined amount, said fluid conveying means being connected to said relief valve for connecting said one side of said relief valve to said second portion of said cable and said other side of said relief valve to said first portion of said cable.

10. The electric cable system of claim 8, wherein said lower rate is about 0.10–0.50 gallons per minute.

11. The electric cable system of claim 9, wherein said predetermined amount is at least about the pressure of the fluid at said second portion of said cable.

12. The electric cable system of claim 11, wherein said predetermined amount is about the pressure of the fluid at said second portion of said cable plus approximately 30 pounds per square inch.

13. The electric cable system of claim 9, further comprising a first isolation valve coupled between the relief valve and said first portion of said cable and a second isolation valve coupled between the relief valve and said second portion of said cable.

14. The electric cable system of claim 8, further comprising a first isolation valve coupled between said check valve and said first portion of said cable and a second isolation valve coupled between said check valve and said second portion of said cable.

15. The electric cable system of claim 8, further comprising a first isolation valve coupled between said flow-limiting valve and said first portion of said cable and a second isolation valve coupled between said flow-limiting valve and said second portion of said cable.

16. The electric cable system of claim 8, further comprising first and second isolation valves for isolating said check valve and said flow-limiting valve from said first portion and said second portion of said cable.

17. The electric cable system of claim 8, further comprising a manually operable by-pass valve coupled between said first portion of said cable and said second portion of said cable for permitting substantially unrestricted fluid flow between said first portion and said second portion of said cable and preventing fluid flow through said manually operable by-pass valve.

* * * * *

UNITED STATES PATENT AND TRADEMARK OFFICE
CERTIFICATE OF CORRECTION

PATENT NO.   : 6,089,267
DATED        : July 18, 2000
INVENTOR(S)  : Gaines

It is certified that error appears in the above-identified patent and that said Letters Patent is hereby corrected as shown below:

Column 3,
Line 58, cancel "at an elevation higher than any"; after "portions" insert -- and a fluid therein under pressure --;

Column 5,
Line 31, change "encircles" to -- encircled --;

Column 6,
Line 58, change "couples" to -- coupled --;
Line 62, change "52" to -- 51 --;
Line 66, change "couples" to -- coupled --.

Signed and Sealed this

Ninth Day of October, 2001

*Attest:*

NICHOLAS P. GODICI
*Attesting Officer*   *Acting Director of the United States Patent and Trademark Office*